Feb. 15, 1966  C. O. ADAMS  3,234,973
METHOD AND APPARATUS FOR FABRICATING A HINGED MAT
Filed Feb. 16, 1962  6 Sheets-Sheet 1

INVENTOR.
CHARLES O. ADAMS
BY
Woodhams, Blanchard and Flynn
ATTORNEYS

Feb. 15, 1966 C. O. ADAMS 3,234,973
METHOD AND APPARATUS FOR FABRICATING A HINGED MAT
Filed Feb. 16, 1962 6 Sheets-Sheet 2
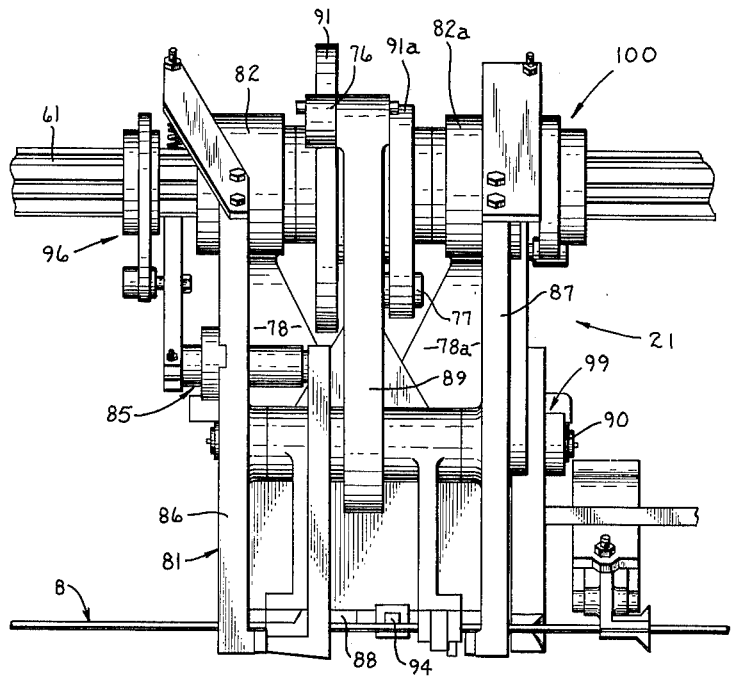
Fig. 14
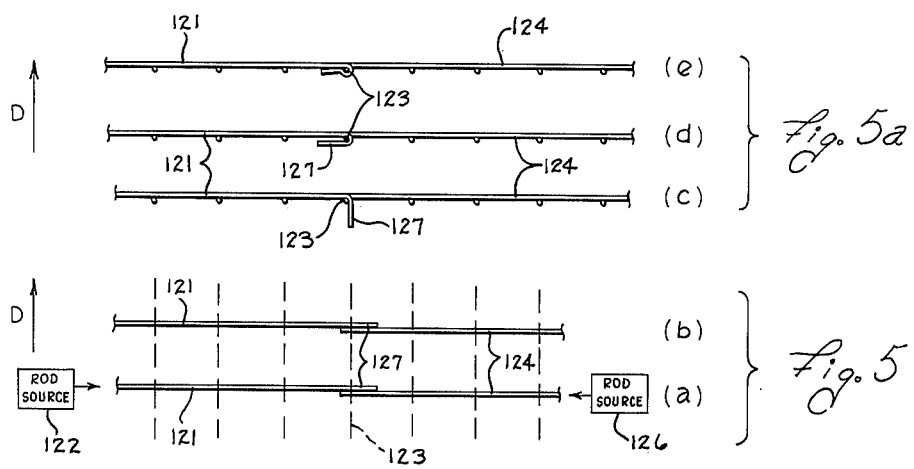
Fig. 5a
Fig. 5
INVENTOR.
CHARLES O. ADAMS
BY
Woodhams, Blanchard and Flynn
ATTORNEYS

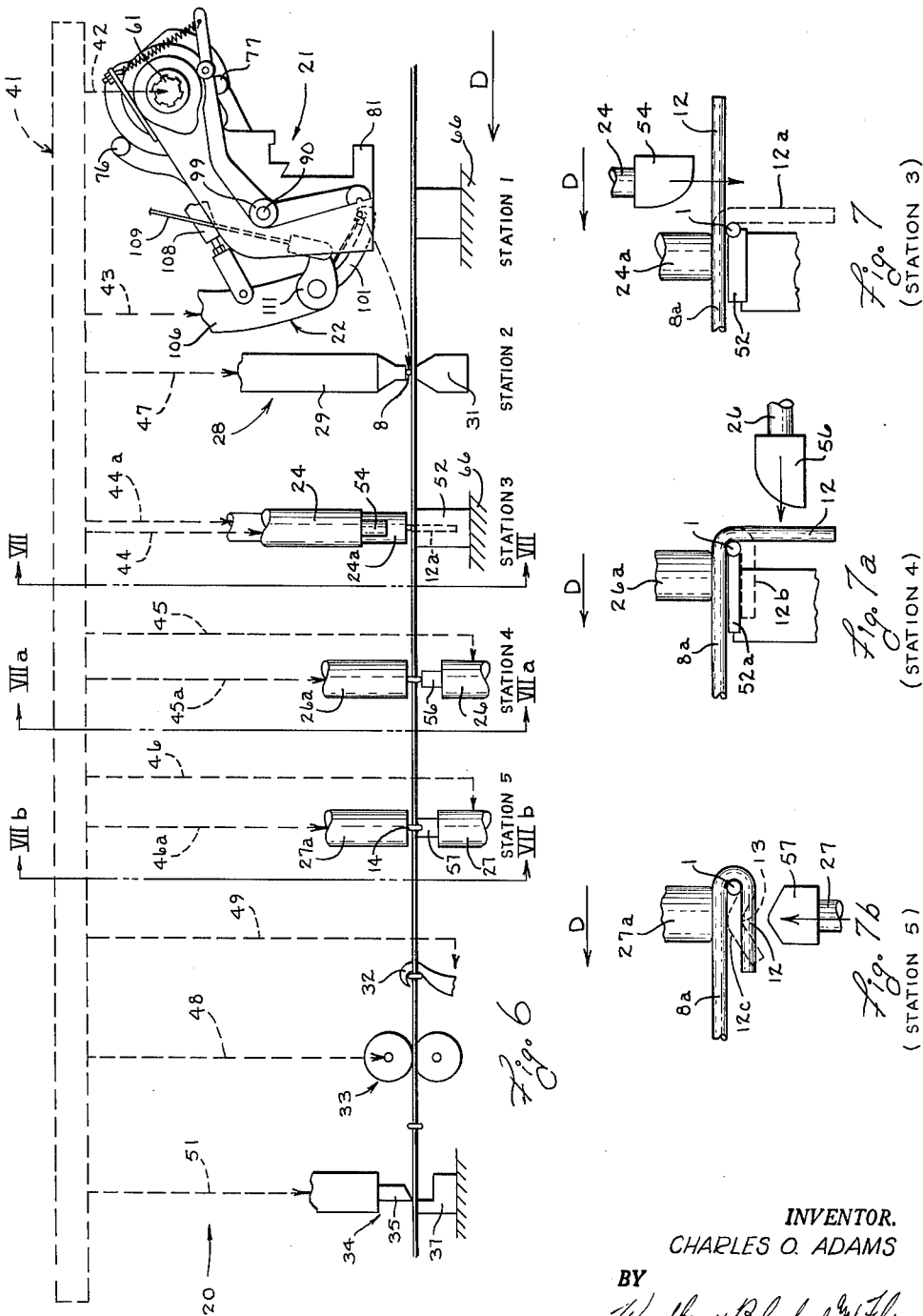

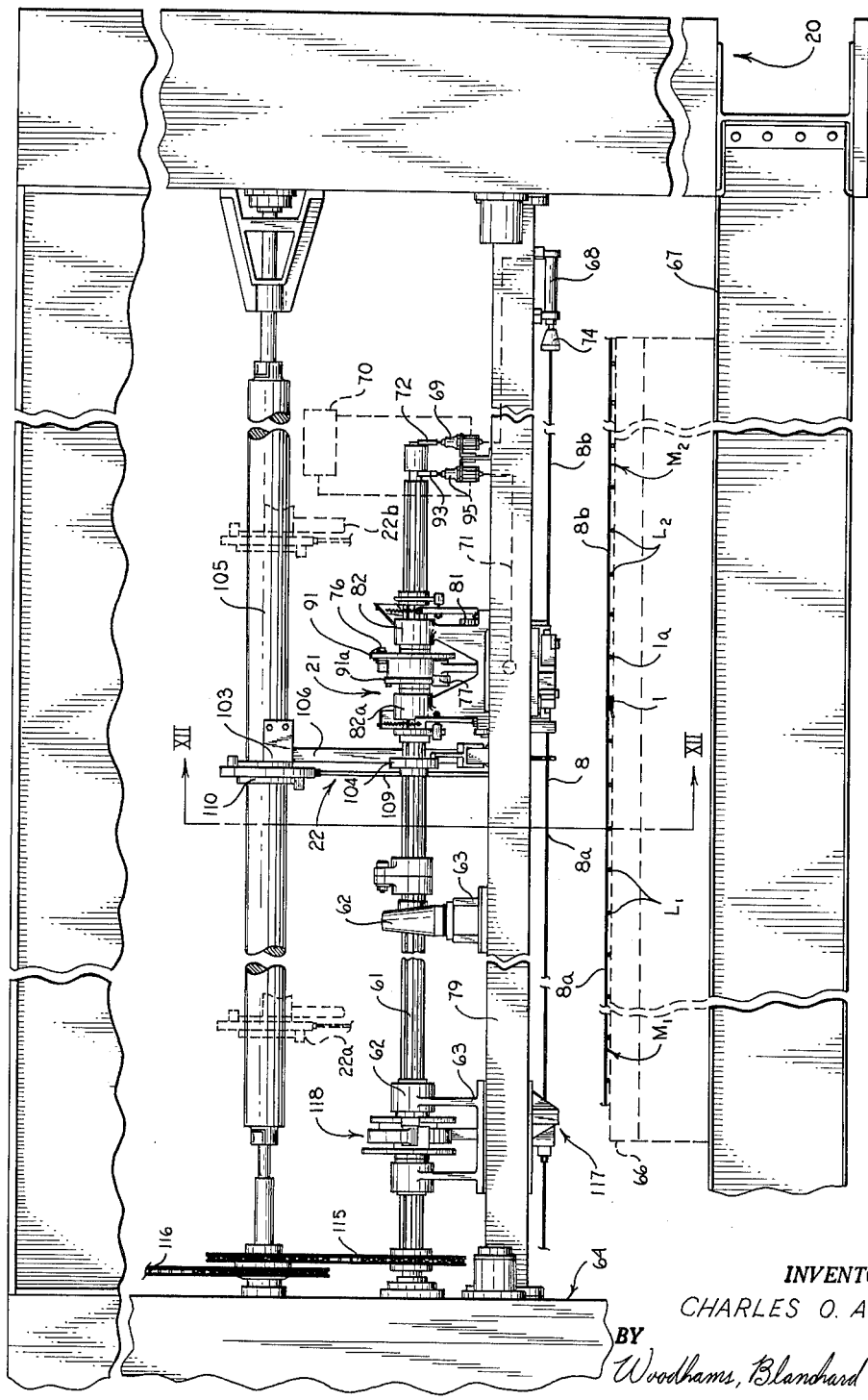

INVENTOR.
CHARLES O. ADAMS
BY
Woodhams Blanchard & Flynn
ATTORNEYS

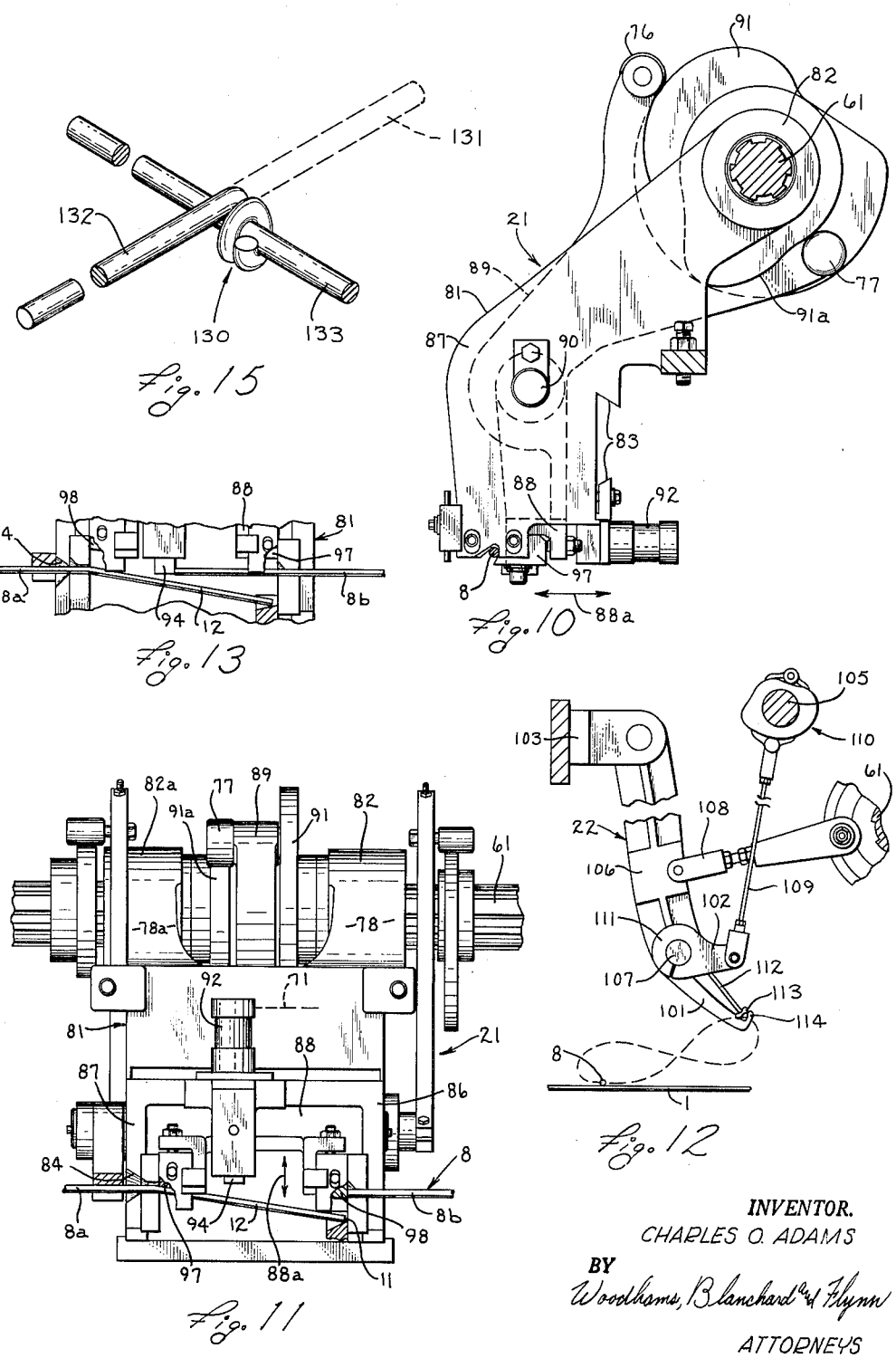

United States Patent Office 3,234,973
Patented Feb. 15, 1966

3,234,973
METHOD AND APPARATUS FOR FABRICATING A HINGED MAT
Charles O. Adams, Kettering, Ohio, assignor to National Electric Welding Machines Co., Bay City, Mich., a corporation of Michigan
Filed Feb. 16, 1962, Ser. No. 173,728
8 Claims. (Cl. 140—112)

This invention relates in general to the fabrication of a hinged and welded mat, and particularly to a method for progressively welding a mat while, at the same time, forming a hinge lengthwise thereof.

The transportation of reinforcing mats of the type used for reinforcing concrete highways, concrete floors, concrete buildings, concrete bridges and the like, has posed a serious problem for many years. Since these mats are of a substantial width, 16 feet being a standard width for highway use, it is not convenient to lay them flat on a truck for transportation from the factory to the place of use. Sometimes the mats are rolled for shipment but this presents serious problems when the bent mats are used. Thus, the mats are preferably made in sections, usually sections of about 16 to 20 feet in length and about 8 feet in width.

In order to provide a wider mat section, these mats have sometimes been arched or curved in a transverse direction to reduce their overall width so that they can fit within and be transported by a truck. However, here again the bent mats require straightening at the point of their use and this is both inconvenient and expensive.

Another approach to this problem has been to provide longitudinal hinging of the mat in order that the mat can be folded to an acceptable width. This type of mat satisfactorily avoids the problems set forth above, but has in the past been expensive to manufacture due to the large amount of special handling required.

Hinged mats have been previously made by completing the mat in the usual manner, then cutting it along the line at which the hinge connection is desired, moving the mats into slightly overlapping relationship with each other, and finally bending the overlapped transverse wires around the nearest longitudinal wire. This method produces a satisfactory product, but it requires an extra operation after the mat is otherwise completed and it also presently requires large and expensive equipment to bend simultaneously all of the transverse wires along the hinge line. On the other hand, if the wires are not bent simultaneously, the labor cost for the bending is even greater in the long run than the cost of the equipment necessary to bend them simultaneously.

Therefore, it is desirable to provide a method for fabricating a hinged mat which will avoid the problems above set forth, which will reduce the present cost of producing the product and which can be carried out by a relatively inexpensive addition to presently known equipment for fabricating welded mats.

Accordingly, the objects of the invention include:

(1) To provide a method for economically fabricating a hinged reinforcing mat of the type used for reinforcing concrete highways and other reinforced concrete structures, and to provide an apparatus for carrying out the method.

(2) To provide a method as aforesaid which can be carried out automatically as a part of the procedure by which the mat itself is fabricated and without reducing the production speed of the mat welding operation.

(3) To provide a method as aforesaid which can be practiced by equipment compatible with, and capable of being incorporated into, a standard mat welding machine without reducing the welding or other capability thereof.

(4) To provide a method as aforesaid which can be readily modified as needed to be capable of practice by equipment which can be incorporated mechanically into a standard mat welding machine to minimize the problems of timing the hinge forming apparatus with the rest of the mat welding apparatus.

(5) To provide a method, as aforesaid, and apparatus for carrying out said method, which will not adversely affect the fabrication of the mat itself so that unhinged mats can be fabricated by the same apparatus.

(6) To provide a method and apparatus as aforesaid which can operate progressively as the mat is being formed and be independent of the length to which said mat is cut.

(7) To provide a method and apparatus as aforesaid which will involve simultaneous operations upon a plurality of transverse wires at a plurality of stations to which these wires are successively presented.

(8) To provide a method, as aforesaid, which can be co-ordinated with the welding operation whereby to simplify the equipment required to form the hinge.

(9) To provide a method and apparatus, as aforesaid, which can be integrated into a standard mat welding machine so that no further or special handling of the mat is required after the welding operation is completed and so that the mat can be cut off in sections of desired length at the usual point and in the usual manner and may thereafter be transported as a finished product for immediate use.

(10) To provide a hinged mat construction which can be produced by said method and upon said apparatus.

Other objects and purposes of the invention will be apparent to persons acquainted with methods and apparatus of this general type upon reading the following specifications and upon inspection of the accompanying drawings.

In the drawings:

FIGURE 5 is a plan view of a transverse wire in the first two steps of a modified process.

FIGURE 5a is an end view of a transverse wire in the three steps of said modified process which follow the two steps shown in FIGURE 5.

FIGURE 6 is a schematic, side view of an apparatus showing the stations in the apparatus by which the steps of the method can be performed.

FIGURE 7 is an enlarged and schematic, sectional view taken on the line VII—VII in FIGURE 6.

FIGURE 7a is an enlarged and schematic, sectional view taken on the line VIIa—VIIa in FIGURE 6.

FIGURE 7b is an enlarged and schematic, sectional view taken on the line VIIb—VIIb in FIGURE 6.

FIGURE 8 is a broken view of the apparatus appearing in FIGURE 6, as seen from the rightward (rear) end thereof.

FIGURE 10 is a sectional view taken along the line X—X in FIGURE 9.

FIGURE 11 is a bottom view of said cutting and bending mechanism.

FIGURE 12 is a fragmentary sectional view taken along the line XII—XII in FIGURE 8.

FIGURE 13 is a fragment of the structure appearing in FIGURE 11.

FIGURE 14 is a front view of said cutting and bending mechanism.

FIGURE 15 is a perspective view of an alternate hinge.

The terms "upper," "lower" and words of similar import shall have reference to the apparatus of the invention as appearing in FIGURE 8. The terms "front," "rear" and words of similar import will have reference to the "left" and "right" end respectively of the apparatus of the invention as appearing schematically in FIGURE 6. The terms "inner," "outer" and derivatives thereof will have reference to the geometric center of said apparatus and/or the mat produced thereby.

*General description*

In general, the invention consists of feeding a transverse wire into a position above and transverse of a plurality of longitudinal wires in a substantially conventional manner, but controlling such feeding so that the transverse wire is slightly longer than that which would be required to form a conventional mat without a hinge. The transverse wire is held in this position and cut at a selected point intermediate its ends, and an end portion of one segment adjacent the cut is offset sidewardly (axially of the longitudinal wires). One of said segments is then moved toward the other segment so that the adjacent end portions of the segments are overlapped above and across one central longitudinal wire. The two segments are now moved downwardly against the longitudinal wires and, except for the offset portion, welded to said longitudinal wires in a conventional manner.

The longitudinal wires are intermittently advanced in a conventional step-by-step manner so that one transverse wire after another can be moved endwise into the cutting and bending station and then sidewise and downwardly into the welding station.

The transverse wire is then moved sidewise with the longitudinal wires from the welding station through the bending stations where the offset portion is formed into a hook around the said central longitudinal wire to form the hinge. The welded and hinged mat is then fed to shear means in the usual manner for cutting the mat into sections of the desired length.

By forming the hinge structure simultaneously with the welding operation at different stations on the same apparatus, the continuity of the automatic mat-forming operation is maintained, the equipment required for the complete fabrication is held to a minimum, and no extra handling is needed.

*Detailed description*

Reference is made to the drawings (particularly FIGURES 1 to 5) for the purpose of disclosing both the method and the mat produced thereby.

Figure 1:
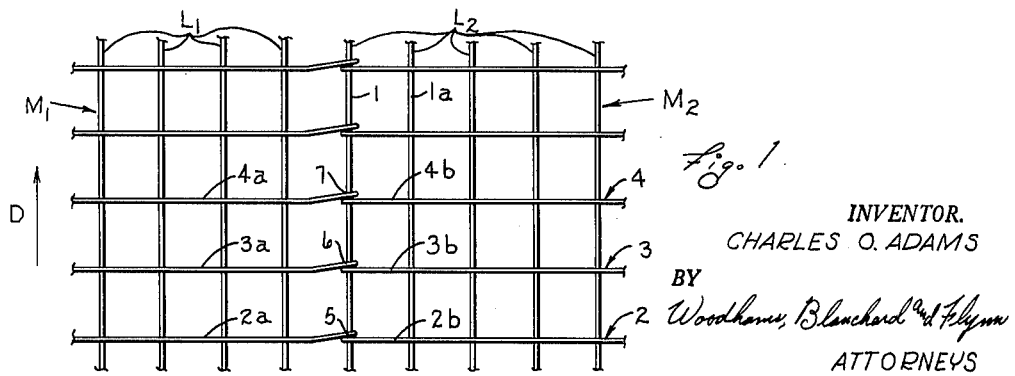
FIGURE 1 is a top plan view of a fragment of a reinforcing mat of the type made by the method of the present invention.

FIGURE 1 shows a plan view of a mat formed according to the invention and comprising two hinged sections $M_1$ and $M_2$. The section $M_1$ has a plurality of parallel longitudinal wires $L_1$ and a plurality of transverse wire segments of which three appear at $2a$, $3a$ and $4a$. The section $M_2$ has longitudinal wires $L_2$, one of which is specifically identified as the hinge wire 1. Three of the transverse wire segments in section $M_2$, which are indicated at $2b$, $3b$ and $4b$, are substantially coaxial extensions of the wires $2a$, $3a$ and $4a$, respectively. In fact, in one preferred embodiment of the invention, the segments $2a$, $3a$ and $4a$, and the segments $2b$, $3b$ and $4b$ are cut from the wires 2, 3, and 4, respectively. The two sections $M_1$ and $M_2$ are hingedly connected to each other along the longitudinal wire 1 in a manner to be described hereinafter.

The inner ends of the segments $2a$, $3a$, $4a$ and the like (FIGURE 1) are wrapped at 5, 6, 7 and the like around the longitudinal wire 1. The transverse wire segments $2a$, $3a$, $4a$ and the like are welded to the longitudinal wires $L_1$ at their points at intersection with each of the longitudinal wires $L_1$. All of the transverse wire segments $2b$, $3b$, $4b$ and the like are welded to the longitudinal wires $L_2$ at their points of intersection with each of the longitudinal wires $L_2$.

Figure 3:
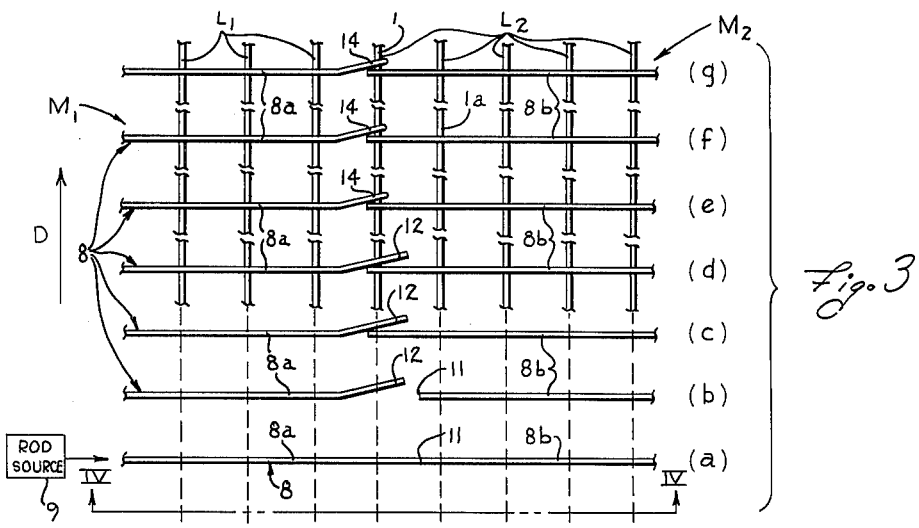
FIGURE 3 is a fragmentary plan view of one transverse wire in seven steps of its processing according to the method of the invention.
Figure 2:
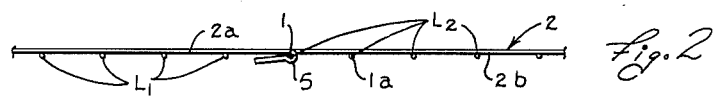
FIGURE 2 is an end view of the mat shown in FIGURE 1.

The steps, by which the mat shown in FIGURES 1 and 2 is made according to the present invention, will now be discussed with reference to FIGURES 3, 4 and 6. FIGURE 3 discloses the transverse wire 2, for illustration, in seven stages of its connection to the longitudinal wires $L_1$ and $L_2$. In FIGURE 3 stage $a$, a length of rod or wire 8 is fed from any convenient rod source 9 into a position above and transverse of the several longitudinal wires or rods $L_1$ and $L_2$. Said source 9 may be a reel and means for moving said wire 8 off of the reel and into position across the longitudinal wires. The source 9 may also be a supply of pre-cut wires or rods and means for advancing such rods, from the same side or opposite sides, into said position across the longitudinal wires.

In stage $b$ of FIGURE 3, the wire 8 is first cut into segments $8a$ and $8b$ at a point 11 between the longitudinal wires 1 and $1a$. The end portion 12 of the segment $8a$, which extends beyond the longitudinal wire 1, is preferably just long enough to be bent around the longitudinal wire 1 and formed into a hook which hinges the segment $8a$ upon the longitudinal wire 1, as shown and developed hereinafter. While wire 8 is in stage $b$, the end portion 12 is bent or offset sidewardly in the direction of movement of the wires $L_1$ and $L_2$, which direction is indicated by the arrow D in FIGURES 1, 3, 4, 5, $5a$, 7, $7a$ and $7b$.

In stage $c$ of FIGURE 3 the segment $8b$ is shown as moved leftwardly with respect to the segment $8a$ sufficiently to cause its leftward end to overlap the longitudinal wire 1. However, similar results can be achieved by moving the segment $8a$ rightwardly so that the end portion 12 intersects the longitudinal wire $1a$ in the same manner that said end portion intersects the wire 1 in the above description.

In stage $d$ of FIGURE 3 the segment $8a$ is welded to the wires $L_1$ and the segment $8b$ is simultaneously welded to the wires $L_2$. Stages $a$, $b$ and $c$ of FIGURES 3 and 4 constitute parts of the method which are performed at one station, here the first station. The welding stage is at the second station and, therefore, the longitudinal wires must be simultaneously moved forwardly with the segments $8a$ and $8b$ as they are moved from the first station into the welding station.

Figure 4:
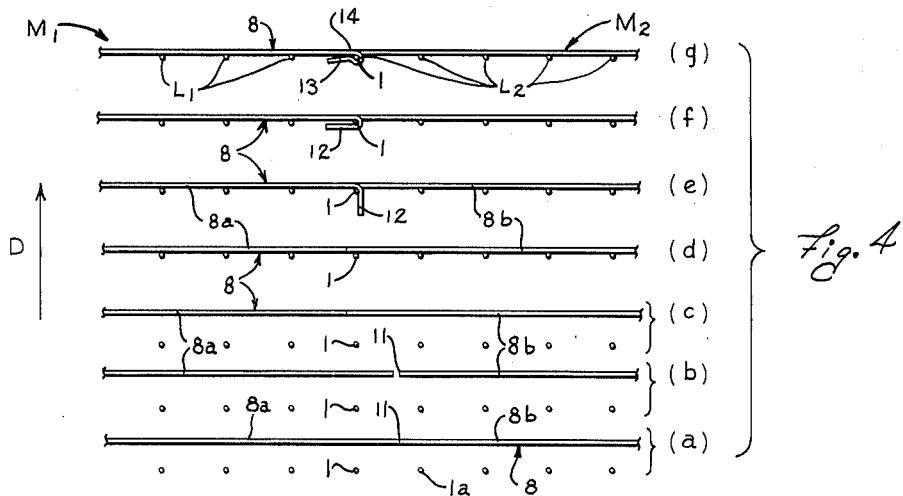
FIGURE 4 is a fragmentary end view of said one transverse wire in the same seven steps of processing of the transverse wire which are shown in the plan views of FIGURE 3.

Stages $e$, $f$, and $g$ of FIGURES 3 and 4 occur in stations 3, 4 and 5 where bending operations are performed upon the end portion 12. As shown in stage $e$ of FIGURE 4, the end portion 12 of the segment $8a$ is bent downwardly around the longitudinal wire 1. In stage $f$ of FIGURE 4 said portion 12 is bent upwardly upon itself around the longitudinal wire 1. In stage $g$ of FIGURE 4 the portion 12 is crimped at 13 so that it forms the hinge 14 which extends closely around more than 180 degrees of the longitudinal wire 1, whereby the wire $8a$ can rotate hingedly around said wire 1, but cannot move transversely with respect to the wire 1.

The schematic disclosure in FIGURE 6 illustrates apparatus 20 for performing the steps illustrated in the stages $a$ through $g$ of FIGURES 3 and 4. FIGURE 7 shows more details of the apparatus for performing the steps illustrated in stages $e$, $f$ and $g$.

Referring to FIGURE 6, combined cutting and bending structure 21, of a nature more fully described hereinafter, is provided for the cutting and bending operation shown in stages $a$, $b$ and $c$ of FIGURE 3. A plurality of transfer mechanisms, one of which appears in solid lines at 22 in FIGURE 8, and others of which are indicated schematically in FIGURE 8 at $22a$ and $22b$, engage the transverse wire 8 in the first station (FIGURE 6). Said transfer mechanisms thereafter move the wire segments 8a and 8b into the second or welding station where they are held by said mechanisms until said segments are clamped between the welding electrodes 29 and 31 of the welding mechanism 28, and welded thereby to the longitudinal wires $L_1$ and $L_2$ (FIGURE 3). The bending shown in stages e, f and g of FIGURE 4 is effected by die members indicated at 24, 26 and 27, respectively, in FIGURES 6 and 7. Hold-down members, such as hydraulically actuated pistons 24a, 26a and 27a, engage the wire 8 and cooperate with the die members 24, 26 and 27, respectively. An advancing member 32, here consisting of a hook, is provided for engaging a welded transverse wire 8 and thereby moving the whole mat assembly stepwise leftwardly. Edge trimming devices, such as the rotating shears 33, may be provided to square or trim the transverse wires to provide a mat having a predetermined and uniform width. A shear 34, including a blade die 36 acting against a base 37, is arranged to cut the longitudinal wires and thereby provide mats of predetermined length. The longitudinal hinge wire 1, as shown in FIGURE 6, extends through the apparatus in its normal relation to the several parts of said apparatus.

Control mechanism 41 (FIGURE 6), for coordinating and effecting the operation of the various parts of the apparatus 20, is connected, as indicated by broken lines, to each of the above-mentioned units for driving same in timed coordination with respect to each other. Particularly, the line 42 indicates power means for connecting the drive shaft 61 to the mechanism 41 whereby the cutting and bending operation is performed by the device 21. The line 43 indicates means operably connecting the transfer device 22 to the shaft 105 which is in turn connected to the control mechanism 41. The broken lines 44, 45 and 46 indicate means connecting the respective bending dies 24, 26 and 27 to the mechanism 41 for coordination of their operation with respect to each other and with respect to the remainder of the apparatus. The hold-down members 24a, 26a and 27a are connected for coordinated operation to the mechanism 41 by the broken lines 44a, 45a and 46a. The lines 47 and 48 indicate means operating the welding electrode 29 and the trimming shears 33, respectively, in coordination with the remainder of the apparatus. The line 49 indicates means operating the hook 32 in coordination with the remainder of the apparatus, and the line 51 indicates means operating the shear 34 in coordination with the remainder of the apparatus. The relative spacing between the stations 1 to 5, for example, may be adjusted to vary the spacing between the transverse wires of the mat. Likewise, the spacing between the longitudinal wires may be varied by appropriate adjustment of the machine and, moreover, the location of the hinge line may also be altered. The transverse wire segment 8a (FIGURES 7, 7a and 7b) is held with respect to the longitudinal wire 1 and the base 52 and 52a by the hold down members 24a, 26a and 27a. The dies 24 and 26 are provided with bending heads 54 and 56 which can engage the end portion 12 and bend it into the positions shown in broken lines at 12a and 12b in FIGURES 7 and 7a, respectively. In station 5 (FIGURE 7b) the die member 27 is moved substantially upwardly so that its die head 57 engages said end portion 12 and crimps it into the position shown at 12c.

Certain parts of the apparatus described in the foregoing paragraphs have been previously used in connection with the handling of wire forms, and some of them are in standard use on machines for the welding of wire or rod into mats. Accordingly, the disclosures in FIGURES 6 and 7 of specific apparatus, by which the above-described process may be carried out, are for illustrative purposes only and are in no way intended to imply that the practice of the process must be restricted to equipment of any particular type. Further, since machines of this type for welding unhinged wire mats are old in the art, specific description of apparatus adapted for carrying out the invention is probably unnecessary. However, to ensure a full disclosure of the invention and specific means of practicing the method, an apparatus for this purpose and particularly adaptable to the present invention is briefly but further illustrated in FIGURES 8 through 13 and described hereinafter.

The drive shaft 61 (FIGURES 6 and 8) is mounted in any convenient manner, such as by the bearings 62 and bearing supports 63, on the frame 64 of the machine 20. The cutting and bending structure 21 is provided for cutting and bending the transverse wire, indicated at 11 and 12 in stages a and b of FIGURE 3. Any suitable means, such as the table shown in broken lines at 66 in FIGURE 8, is provided for supporting and guiding the longitudinal wires $L_1$ and $L_2$, including the wires 1 and 1a, as they appear in FIGURE 3. Wire supporting and guiding means, such as said table 66, is well known to the prior art and hence needs no further detailing except that same is conveniently mounted, if desired, upon a base frame 67.

A device 68 (FIGURES 8 and 11) is mounted on the frame 64 to engage the free end of the transverse wire 8 as it moves into position above the longitudinal wires $L_1$ and $L_2$. The device 68 also moves the segment 8b back, as shown in stage c of FIGURE 3, after the cut 11 is made in the wire 8 in stage b by cutting and bending structure 21 (FIGURE 11). In this embodiment, the device 68 comprises a spring returned air cylinder actuated by a valve 69 which is operated by the cam 72 mounted upon and rotatable with the shaft 61. The plunger 73 of the air cylinder 68 has on its free end a cup 74, which is preferably fabricated of a shock absorbing material, such as rubber. Actuation of said air cylinder by the valve 69 causes the leftward movement of the cup 74, hence movement of the segment 8b across the longitudinal wire 1. The valves 69 and 95 may be connected to a source of pressure fluid, such as compressed air, which is indicated by broken lines at 70 in FIGURE 8.

The cutting and bending structure 21 (FIGURES 9, 10, 11 and 14) has a U-shaped body 81 which is rigidly secured by any convenient means, such as the dovetail structure 83 (FIGURE 10), upon the horizontal member 79 (FIGURE 8) of the frame 64. The body 81 is rotatably held with respect to the shaft 61 by bearings 82 and 82a in the upwardly extending arms 78 and 78a of the body 81. A pair of guide openings, of which one is shown at 84 (FIGURE 11), are provided through the spaced side flanges 86 and 87 of the body 81 for the reception and guidance of the transverse wire 8.

A cutting yoke 88 (FIGURE 11) is slidably supported upon the body 81 between the flanges 86 and 87 for movement as indicated by the arrows 88a. The yoke 88 is moved by the lower end of a lever 89 which is pivotally supported upon the shaft 90 between the flanges 86 and 87 upon which the shaft 90 is mounted. Cams 91 and 91a are mounted upon the shaft 61 between the bearings 82 and 82a. The upper end of the lever 89 is bifurcated to support cam followers 76 and 77 on diametrically opposite sides of said cams 91 and 91a for engagement thereby. The cam follower 76 is engaged by the cam 91 to operate the lever 89 in a cutting direction and the cam follower 77 is engaged by the cam 91a to operate the lever 89 in a retracting direction.

The yoke 88 supports at its front end (bottom end in FIGURE 11) a pair of die elements 97 and 98, which are adjusted so that cutting die 98 cuts the wire 8 at point 11 therein just before bending die 97 engages the rightward portion 12 of the segment 8a and bends it downwardly, such bending actually being forwardly (FIGURE 3) or in the direction of movement of the longitudinal wires $L_1$ and $L_2$.

After said yoke has been moved to cut and bend the wire 8 (FIGURE 11), said yoke is retracted and pressure fluid is directed to said cylinder 92 through conduit 71 by valve 95 in response to the operation of the valve 95 by the cam 93 (FIGURE 9) on the shaft 61. The plunger of cylinder 92 supports a blocking member 94 which is moved into the path of the segment 8b just prior to its leftward movement by the air cylinder 68, so that the leftward end of said segment 8b will stop at the proper point in relation to the longitudinal wire 1.

The crank 85 (FIGURE 14) is pivotally supported between its ends upon the side flange 86 so that its upper end is engaged and moved by the cam device 96 on shaft 61. The lower end of crank 85 is constructed to guide the wire 8 through the guide opening 84 (FIGURE 11) in the flange 86. The cam device 96 permits the crank 85 to move away from the end portion 12 of wire 8 as it is cut by the die 98 and while it is engaged by the bending die 97.

The crank 99 (FIGURE 14) is pivotally supported between its ends upon the side flange 87 so that its upper end is engaged and moved by the cam device 100 on shaft 61. The lower end of crank 99 is designed to guide the wire 8 through an opening (like opening 84 in flange 86) in the flange 87. The crank 99 is held in snug engagement with the wire 8 by the cam device 100 while the bending operation is performed by the die 97. This ensures a satisfactory bend, and not merely a flexion, of the end portion 12. The cutting, bending and overlapping operations appearing in stages a, b and c of FIGURES 3 and 4, as described above, are all completed by the structure 21 while the wire 8 is in station 1.

Figure 9:
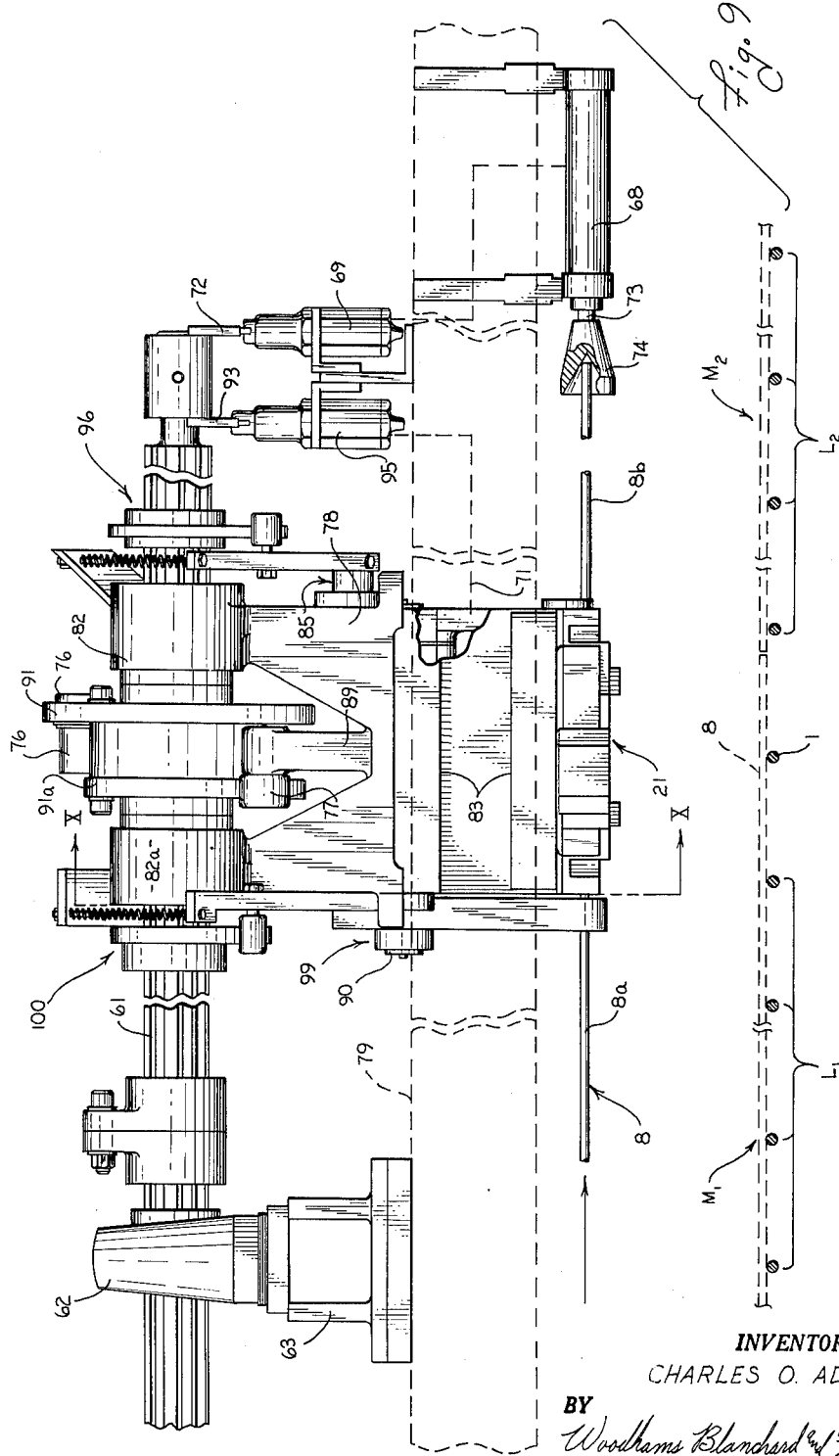
FIGURE 9 is an enlarged fragment of FIGURE 8 showing the cutting and bending mechanism thereof.

The rod segments 8a and 8b are simultaneously moved downwardly and forwardly from their solid line positions of FIGURE 9 into their broken line positions by a plurality of transfer mechanisms 22 (FIGURES 8 and 12), which are each supported upon the frame 64 by means including the bracket 103. Said mechanisms 22 are arranged for gripping the rod 8 while it is being held by the cutting and bending structure 21 and thereafter moving the rod downwardly and forwardly into position upon the longitudinal wires $L_1$ and $L_2$ in station 2 (FIGURE 6).

Various types of mechanisms, such as that identified herein as the transfer mechanism 22, have been developed in the past for moving transverse wires from their initial position above the longitudinal wires into a position where they are welded to said longitudinal wires. One typical transfer mechanism 22 (FIGURES 8 and 12) consists of a pivot bar 106 pivotally supported at its upper end upon the bracket 103 and rotatably supporting a shaft 107 (FIGURE 12) on the lower end thereof. A pitman 108 is pivotally connected at one end to the bar 106 and at its other end to the shaft 61 by a cam device 104 whereby rotation of shaft 61 causes an oscillatory movement of said bar 106 around shaft 105.

A reciprocable rod 109 is connected at its upper end by the cam device 110 to the shaft 105 for vertical reciprocation thereby. The lower end of rod 109 is connected to one arm 102 of the crank 111, which is rotatably supported upon shaft 107. The other arm 101 on crank 111 normally extends downwardly and rearwardly from the lower end of the bar 106 and has a fixed jaw 114 integral with and extending rearwardly from the lower end thereof. A movable jaw 113 is pivotally supported upon the arm 101 adjacent the fixed jaw 114 for engaging and gripping a wire 8 therebetween. A rod 112 extends between and is pivotally connected to a movable jaw 113 and the lower end of the bar 106. Thus, the movable jaw 113 is moved with respect to the fixed jaw 114 each time the arm 101 is moved by rod 109 with respect to the bar 106. The pitman 108 and rod 109 are interrelated to the rest of the apparatus 20 and to each other so that the movable jaw 113 is open as said arm 101 approaches a transverse wire 8 which is held by the cutting and binding structure 21. Said jaws are closed while the arm 106 moves from the structure 21 (FIGURE 6) and into the station 2 where said jaws hold the wire until the welding electrodes 29 and 31 grip the wire 8 therebetween. The jaws 113 and 114 are then opened to release the wire 8 and the arm 106 moves the jaws 113 and 114 first forwardly and then upwardly and rearwardly to repeat their cycle.

A plurality of transfer mechanisms 22 are preferably provided for properly transferring the cut segments 8a and 8b of each wire 8 in timed relationship with the movement of the longitudinal wires $L_1$ and $L_2$. Where such segments are approximately 7 feet and 9 feet, respectively, in length, as is normal for a mat 16 feet wide, about three or four of the transfer devices 22 will preferably be utilized with each wire segment. Any suitable mechanical means such as the chain and sprocket mechanism 115 (FIGURE 8) may be provided for synchronizing the shaft 105 with the shaft 61. The mechanism 115 may, if desired, be duplicated at the opposite end of the shafts 105 and 61 to minimize the effect of torsional deflection in either or both of the shafts. The shaft 105 is connected to conventional drive means (not shown) by chain and sprocket mechanism 116.

Operation

The operation of the apparatus, which has been disclosed herein to illustrate one type of machine whereby the method of the invention can be practiced, is probably evident from the foregoing description. To summarize briefly such operation, the longitudinal wires $L_1$ and $L_2$ (FIGURE 8) are intermittently advanced through the rear of the machine 20 (FIGURES 6 and 8) onto the table or bed 66 thereof in predetermined, preferably parallel and spaced relationship. A plurality of transverse wires 8 are fed one at a time into the machine above the longitudinal wires $L_1$ and $L_2$ (FIGURES 8 and 9). Each transverse wire 8 is engaged in its turn and held by means including the cutting and bending structure 21 while the operations shown in stages a, b and c in FIGURES 3 and 4 are performed upon the wire. If the wire 8 is being fed from a roll of such wire, it is at this time severed from the wire remaining on the roll by the cutting mechanism 117, which is connected to and operated by the cam mechanism 118 mounted upon and operated by the shaft 61.

When the foregoing cutting operations have been completed, the transfer mechanisms 22 are moved into engagement with the wire segments 8a and 8b, and the wire segment 8b is moved leftwardly, FIGURE 8 by the device 68 into the position where its left end is overlapped with the segment 8a. Both segments of wire 8 are then released from the cutting mechanism 21 for simultaneous movement by the transfer mechanisms 22, without changing the relative positions of said segments, downwardly and forwardly into their positions upon the longitudinal wires $L_1$ and $L_2$. At the same time, the longitudinal wires are advanced along the table 66 a corresponding horizontal distance.

The welding electrodes are now moved into contact with the wire segments 8a and 8b and with the longitudinal wires $L_1$ and $L_2$ for holding said wires in their relative positions and at the same time welding them together. As soon as the wires are thusly gripped by the welding electrodes, the transfer mechanisms 22 are moved forwardly a distance and are then moved upwardly and rearwardly into engagement with the next set of wire segments 8a and 8b. The crank 111 is manipulated by the rod 109 during the rearward movement of the bar 106 so that the arm 101 does not interfere with the rod segments 8a and 8b disposed upon the longitudinal wires in station 2 (FIGURE 6). The operation of each crank 111 is also such that its jaw 113 is opened and closed at the appropriate times for engaging and disengaging the segments 8a and 8b.

After the welding operation is performed, the longitudinal wires $L_1$ and $L_2$ are again advanced so that the welded transverse wire 8 is moved into station 3 where the first bending operation is performed upon the end portion 12 thereof. At the same time, another wire is being welded and a third wire is being cut and bent in stations 2 and 1, respectively. Further advancement of the longitudinal wires in steps along the table 66 moves said transverse wire 8, and each succeeding wire 8, into and out of the bending stations 4 and 5, where the crimped hook is completed. Thereafter, each transverse wire 8 which has now been welded and hinged is moved past the trimming shears 33 and the cutting shear 34 in a substantially conventional manner.

Modification

In all of the foregoing it has been assumed that the segment 8b of the transverse wire is moved, after it is cut from segment 8a, in a direction counter to the original feeding movement of the transverse wire 8 from the source 9 in order to provide the desired overlap between the segments 8a and 8b. It will be readily understood, however, that such overlap can be effected by moving the segment 8a toward the segment 8b. For example, where the transverse wire 8 is fed from a reel, the segment 8a thereof (stage b in FIGURE 3) may be moved rightwardly, after the segment 8b is cut off, to overlap the transverse wire 8b and extend across the longitudinal wire 1a. The overlapped end of segment 8a can then be bent around the longitudinal wire 1a, as the wire 8 moves through the stations 3, 4 and 5 (FIGURE 6) in the manner discussed above with respect to the wire 1.

It has been assumed throughout the foregoing disclosure that the wire 8 is fed from only one side of the apparatus. It will be recognized that two wires may be fed at the same time from two sides, as shown in FIGURE 5, and thus eliminate the necessity for the cutting and bending operation performed by the mechanism 21 (FIGURE 6). In this case, the segment 121 (FIGURE 5) may be fed from a source 122, such as a reel of wire or rod, so that it overlaps the longitudinal wire 123. A second segment 124 may be fed at the same time from a second wire source 126 into a position where one end thereof overlaps the adjacent end of the wire segment 121 and the two overlapped ends both extend across the longitudinal wire 123. Thus, said segments 121 and 124 are in about the same relative positions as those occupied by segments 8a and 8b in stage c of FIGURE 3. The subsequent welding and hinge forming operations may then be performed in the same manner as above described with respect to the mat shown in FIGURES 3 and 4. The end portion 127 of the wire segment 121, which is bent around the wire 123, need not be offset with respect to the remainder of its segment because the entire segment 121 can be initially fed into a position which is offset sidewardly of the segment 124.

FIGURE 15 discloses a wrapped hinge 130 which can be used in place of the clinched hook hinge shown at 5 in FIGURES 1 and 2. The hinge 130 is preferably formed in one station by rotatable means (not shown) which engages the end portion 131 (broken lines) of the segment 132 and wraps it around the hinge wire 133 so that the segment 132 can pivot around the hinge wire 133.

Although a particular preferred embodiment of the invention has been disclosed above in detail for illustrative purposes, it will be understood that variations or modifications of such disclosure, which lie within the scope of the appended claims, are fully contemplated.

What is claimed is:

1. In a method for providing a hinged mat structure, the steps comprising:

feeding a plurality of substantially parallel, elongated longitudinal wires in substantially the same direction into a welding zone so that said longitudinal wires lie substantially within the same plane;

moving first and second, elongated transverse wires individually with respect to each other and with respect to the longitudinal wires into positions wherein the axes of said transverse wires are substantially parallel, are transverse to said longitudinal wires and are adjacent said welding zone with the adjacent end portions of said transverse wires being overlapped and extending across one selected longitudinal wire;

welding one transverse wire to the longitudinal wires on one side of said selected longitudinal wire so that an end portion of said one transverse wire is free from connection to said longitudinal wires and crosses said selected longitudinal wire and welding the other transverse wire to the selected longitudinal element and to the longitudinal wires on the other side thereof; and pivotally connecting said end portion of said one transverse wire to said selected longitudinal wire.

2. In a method for providing a hinged mat structure, the steps comprising:

feeding a plurality of substantially parallel, elongated longitudinal wires in substantially the same direction into a welding zone so that said longitudinal wires lie substantially within the same plane;

moving first and second, elongated transverse wires individually with respect to each other and with respect to the longitudinal wires into substantially coaxial positions transverse to said longitudinal wires and adjacent said welding zone, the adjacent end portions of said transverse wires being overlapped and extending across one selected longitudinal wire;

welding one transverse wire to the longitudinal wires on one side of said selected longitudinal wire so that an end portion of said one transverse wire is free from connection to said longitudinal wires and overlies said selected longitudinal wire and, at substantially the same time, securing the other transverse wire to the selected longitudinal wire and to the longitudinal wires on the other side thereof; and bending said end portion of said one transverse wire around said selected longitudinal wire in order to form a pivotal connection therebetween.

3. In a method for providing a hinged mat structure, the steps comprising:

feeding a plurality of substantially parallel, longitudinal wires in substantially the same direction into a welding zone so that said longitudinal wires lie substantially within the same plane;

moving first and second transverse wire segments individually with respect to each other and with respect to the longitudinal wires into positions wherein the axes of said segments are substantially parallel, are transverse to said longitudinal wires and are adjacent said welding zone and an end portion of one segment is overlapped with an end portion of the other segment and both end portions extend across one selected longitudinal wire;

welding said one segment to the longitudinal wires on one side of said selected longitudinal wire so that an end portion of said one segment is free from connection to said longitudinal wires and crosses said selected longitudinal wire and, at substantially the same time, welding the other segment to the selected longitudinal wire and to the longitudinal wires on the other side thereof; and pivotally connecting said end portion of said one segment to said selected longitudinal wire.

4. In a method for fabricating a hinged reinforcing mat, the steps comprising:

feeding a plurality of substantially parallel, longitudinal wires in substantially the same direction into a welding zone so that said longitudinal wires lie substantially in the same plane;

feeding a transverse wire across said longitudinal wires adjacent said welding zone;

cutting said transverse wire into first and second segments at a point near a selected longitudinal wire, and bending in a direction substantially parallel with said plane the end portion of the first segment adjacent said selected longitudinal wire;

moving one of said first and second segments transversely with respect to the other segment and with respect to the longitudinal wires so that the adjacent end portions of both segments both extend across selected longitudinal wire;

welding said first segment to the longitudinal wires on one side of said selected longitudinal wire so that the bent end portion of said first segment is free from connection to said longitudinal wires and crosses said selected longitudinal wire and, at substantially the same time, welding the second segment to said selected longitudinal wire and to the longitudinal wires on the other side thereof; and bending said bent end portion around said selected longitudinal wire to form a hinge.

5. In a method for fabricating a hinged reinforcing mat, the steps comprising:

intermittently moving a plurality of substantially parallel, longitudinal wires in substantially the same direction through a welding zone so that said longitudinal wires lie substantially in the same plane;

feeding a plurality of transverse wires one at a time across said longitudinal wires adjacent said welding zone so that said transverse wires are spaced apart along said longitudinal wires;

cutting each transverse wire into first and second segments at a point intermediate a selected pair of adjacent longitudinal wires;

offsetting in a direction substantially parallel with said plane the end portion of each first segment adjacent the cut;

moving one of said first and second segments in each transverse wire longitudinally with respect to the other segment and transversely with respect to said longitudinal wires so that the adjacent end portions of both said segments both extend across one and only one of said pair of longitudinal wires;

simultaneously moving each pair of first and second segments into engagement with said longitudinal wires and into said welding zone;

welding said first segment to the longitudinal wires on one side of said one longitudinal wire so that the offset end portion of said first segment is free from connection to said one longitudinal wire and crosses said one longitudinal wire and welding the second segment to said one longitudinal wire and to the longitudinal wires on the other side thereof; and bending said offset end portion of the first segment around said one longitudinal wire to form a hinge.

6. The method defined in claim 5 wherein said welding step is performed on one transverse wire simultaneously with the cutting and offsetting of another transverse wire.

7. The method defined in claim 5 wherein said longitudinal wires are moved each time the segments of a transverse wire are moved against said longitudinal wires for the welding of said segments to said longitudinal wires; and wherein said bending is performed in three steps following said welding step and synchronized therewith.

8. In a method for fabricating a hinged reinforcing mat, the steps comprising:

intermittently moving a plurality of substantially parallel, longitudinal wires in substantially the same direction through a welding zone so that said longitudinal wires lie substantially in the same plane;

feeding a plurality of transverse wires one at a time across said longitudinal wires adjacent said welding zone in coordination with the movement of said longitudinal wires so that said transverse wires are spaced apart along said longitudinal wires;

cutting each transverse wire one at a time into first and second segments at a point near a central longitudinal wire;

bending in a direction substantially parallel with said plane the end portion of the first segment adjacent said central longitudinal wire;

moving one of said first and second segments in each transverse wire in a lengthwise direction with respect to the other segment and transversely with respect to said longitudinal wires so that the adjacent end portions of both segments both extend across said central longitudinal wire;

simultaneously moving each pair of first and second segments into engagement with said longitudinal wires and into said welding zone;

welding said first segment to the longitudinal wires on one side of said central longitudinal wire so that the bent end portion of said first segment is free from connection to said central longitudinal wire and overlies said one longitudinal wire and, at the same time, welding the second segment to said central longitudinal wire and to the longitudinal wires on the other side thereof;

wrapping said bent end portion of said first segment around said central longitudinal wire to form a hinge; and cutting said longitudinal wires simultaneously and uniformly a selected distance from said welding zone.

References Cited by the Examiner

UNITED STATES PATENTS

| | | | |
|---|---|---|---|
| 352,909 | 11/1886 | Billings | 153—64 |
| 1,273,374 | 7/1918 | Johnson | 140—1 |
| 1,306,859 | 6/1919 | Schneider | 153—64 |
| 1,965,993 | 7/1934 | Sommer et al. | 50—495 |
| 2,140,488 | 12/1938 | White | 140—112 |
| 2,187,129 | 1/1940 | Kramer | 140—112 |
| 2,535,328 | 12/1950 | Somerville | 140—102 |
| 2,787,198 | 4/1957 | White | 50—495 |
| 2,939,206 | 6/1960 | Keller | 29—155 |
| 3,045,325 | 7/1962 | Mabie | 29—155 |
| 3,048,203 | 8/1962 | Hunter | 140—71 |
| 3,157,209 | 11/1964 | First et al. | 140—111 |

CHARLES W. LANHAM, *Primary Examiner.*

JACOB L. NACKENOFF, *Examiner.*